United States Patent [19]

Trzecieski et al.

[11] Patent Number: 5,026,451
[45] Date of Patent: Jun. 25, 1991

[54] METHOD AND APPARATUS FOR APPLYING THERMO-PLASTIC PROTECTIVE COATING TO PIPES

[75] Inventors: Michael A. Trzecieski, Toronto; Clifford R. Ferguson, Alberta, both of Canada

[73] Assignee: Shaw Industries Ltd., Rexdale, Canada

[21] Appl. No.: 362,934

[22] Filed: Jun. 8, 1989

Related U.S. Application Data

[63] Continuation-in-part of Ser. No. 193,814, Jun. 12, 1988, abandoned.

[51] Int. Cl.⁵ .................. B29C 47/06; B29C 47/20
[52] U.S. Cl. .................. 156/244.27; 156/244.12; 156/244.13; 156/324.4; 264/209.3; 264/209.4; 264/279; 425/71; 118/405; 118/125
[58] Field of Search ............... 118/405, 125; 148/264; 156/498, 244.27, 244.13, 244.12, 244.24, 324.4; 264/209.3, 209.4, 237, 271.1, 279; 425/71, 122; 427/398.3; 138/145, 146

[56] References Cited

U.S. PATENT DOCUMENTS 3,694,538 9/1972 Okamoto .................. 425/71
3,868,265 2/1975 Sakai .................. 264/229
4,510,002 4/1985 Stucke .................. 156/244.13
4,675,054 6/1987 Ayukawa .................. 148/264

FOREIGN PATENT DOCUMENTS 2257135 6/1974 Fed. Rep. of Germany .

Primary Examiner—Michael W. Ball
Assistant Examiner—Francis J. Lorin
Attorney, Agent, or Firm—Ridout & Maybee

[57] ABSTRACT

A method and apparatus are described, for extruding a thermoplastic protective jacket onto a steel pipe. The pipe is first coated with a layer of epoxy which is partly cured, and then is conveyed through a cross-head extruder where a layer of copolymer or other suitable adhesive is applied. The outermost thermoplastic jacket may be co-extruded with the adhesive layer or laid down onto the pipe as it passes through a second cross-head extruder. Radial pressure is applied to a band of surface about the jacketed pipe which has been cooled to a stage such that the outer surface of the thermoplastic is hardened while the inner portion thereof remains above the softening temperature, thereby achieving good adhesion of the jacket to the pipe, without dislocating or blemishing the thermoplastic protective jacket.

15 Claims, 5 Drawing Sheets

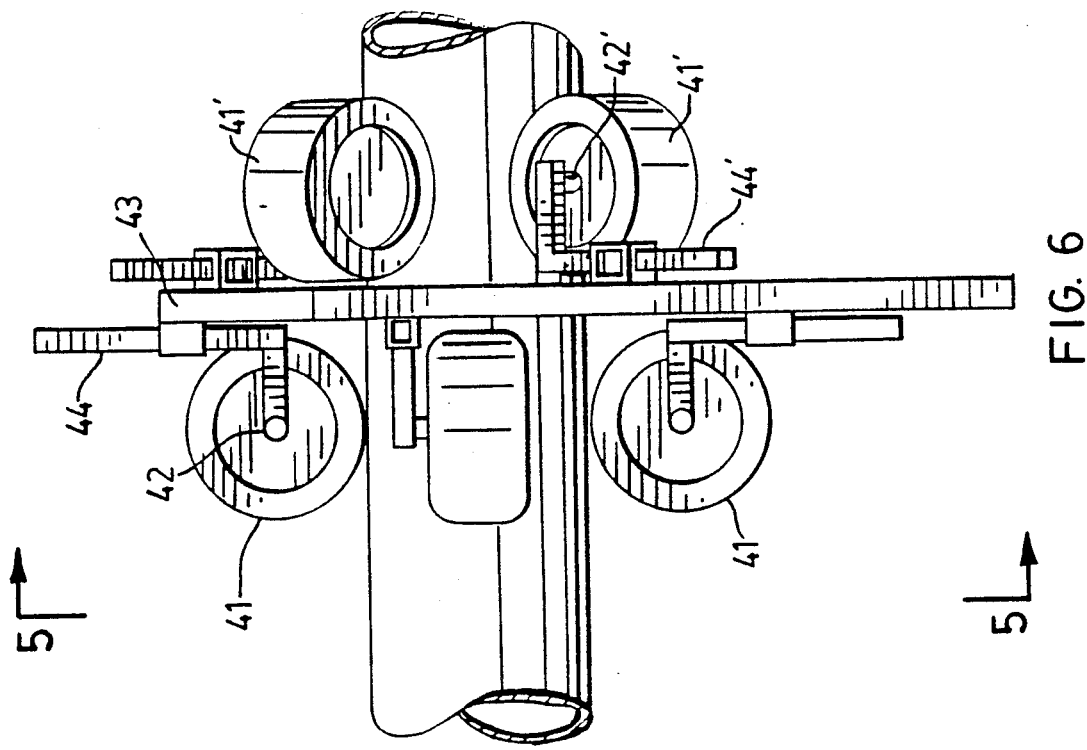
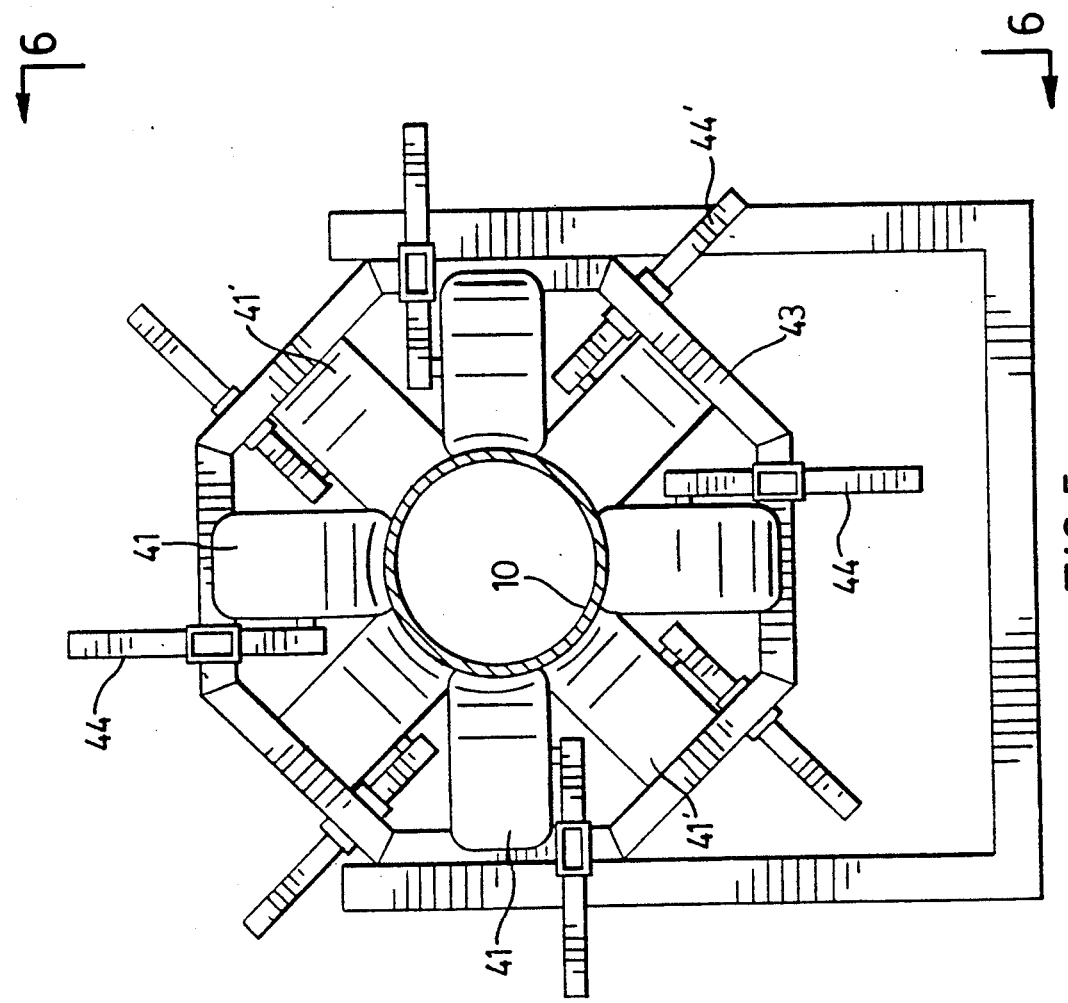

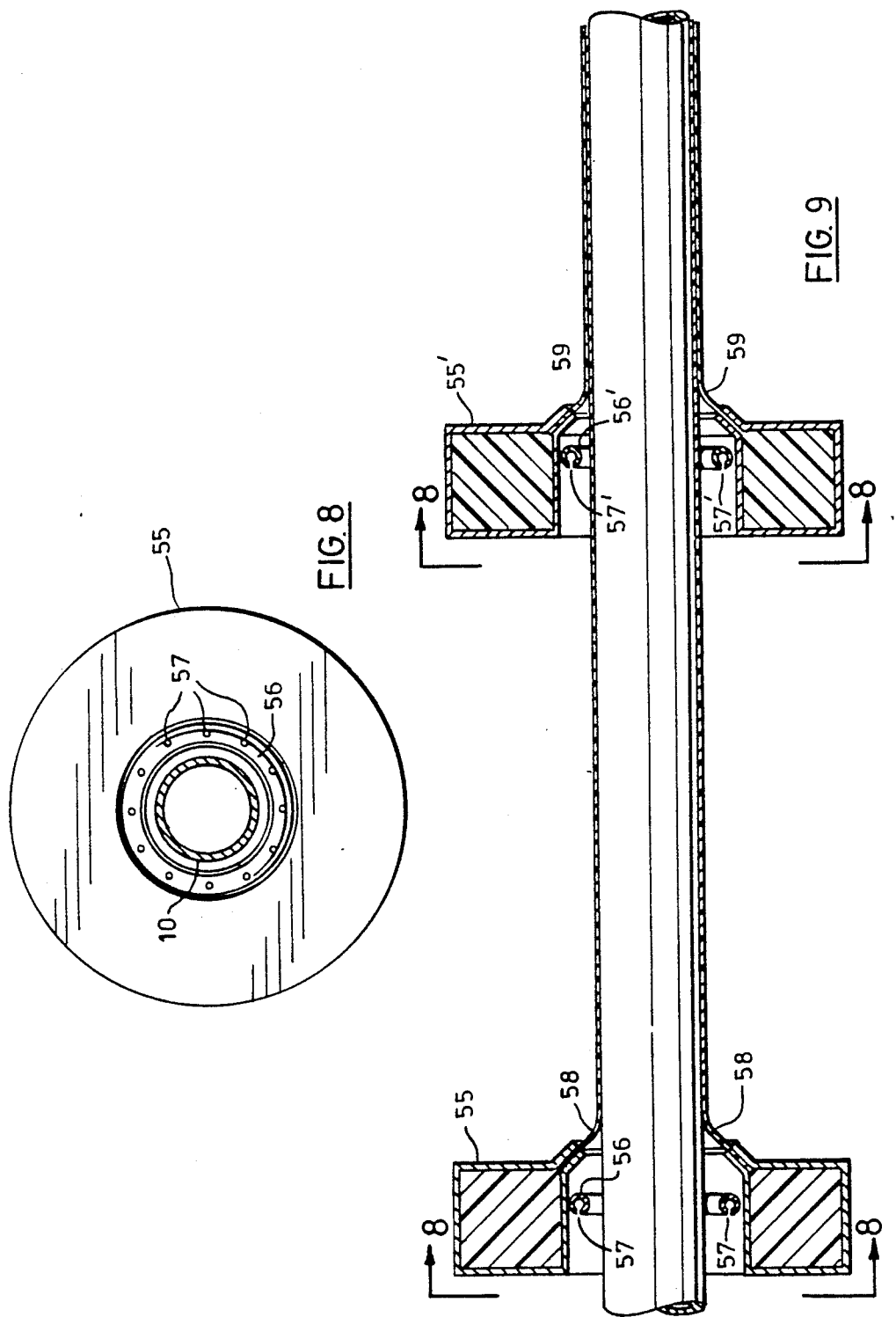

METHOD AND APPARATUS FOR APPLYING THERMO-PLASTIC PROTECTIVE COATING TO PIPES

CROSS-REFERENCE TO A RELATED APPLICATION

This patent application is a continuation-in-part of our copending application Ser. No. 07/193,814, filed on May 12, 1988 abandoned, and entitled Method and Apparatus for Applying Thermoplastic Protective Coating to Pipes.

FIELD OF THE INVENTION

The present invention relates to a method and apparatus for applying a protective thermoplastic jacket to a pipe by cross-head extrusion, and in particular to the jacketing of pipe with high-density polyethylene (HDPE).

BACKGROUND OF THE INVENTION

Steel pipes or tubing which are intended for underground installation must be protectively coated against corrosion. There is a substantial body of art relating to apparatus and methods for the application of a thermoplastic covering to a pipe, first covered with an adhesive coating.

"Cross-head" extrusion will be understood throughout the description and claims herein to refer generally to known processes for coating a pipe by conveying it longitudinally through the annular nozzle or head of an extruder, operable to extrude tubular coatings of adhesive film and jacketing material over the pipe as it passes through the extrusion head. Examples of cross-head extrusion apparatus and of the use of such in jacketing a steel pipe are referred to in U.S. Pat. Nos. 4,386,996 (Landgraf et al.); 4,484,877 (Stucke); 4,451,413 (Stucke et al.); 4,510,007 (Stucke); and 4,519,863 (Landgraf et al.).

The process of cross-head extrusion is variously referred to as a "straight-through" or "endo" process to distinguish it from the older known technique of enveloping a steel pipe by spiral wrapping. That method involves the simultaneous winding of pipe with a double layer of sheet material, the inner being an adhesive strip and the outer thermoplastic, in screw thread fashion as disclosed, for example, in U.S. Pat. No. 3,616,006 (Landgraf et al.).

Where it can be used, the "endo" process for applying an adhesive-thermoplastic multilayer covering to pipe generally produces a product having properties superior to a pipe spiral-wrapped with like materials. Known pipe coatings applied using a spiral method are subject to weak joints at the overlap and poor coverage of radial or longitudinal welding seams on the pipe. We have found that the disadvantages of spiral wrapping are particularly great where HDPE is to be applied as the outer jacketing material. Pipe which has been spiral-wrapped with that jacketing material often exhibits relatively poor low temperature adhesion of the protective coating.

A number of methods for the jacketing of steel pipe by the application of an adhesive-polyethylene laminate to a pipe which has first been coated with a curable epoxy resin/curing agent mixture (which mixtures will be referred to hereinafter generally as "epoxy primer") have been described in German printed Patent No. 19 65 802 (spiral wrapping method) and in U.S. Pat. No. 4,510,007 (Stucke) (straight-through extrusion). However, the "endo" process presents its own practical difficulties in the effective jacketing of pipe using such materials, particularly when high-density polyethylene is used as the outer cladding.

Firstly, in the "endo" process the application of an even layer of epoxy primer, critical to good results, is not a straightforward matter, unlike in the spiral process, where liquid primer can be applied to the surface of a pipe turned about its long axis. It has been proposed, in U.S. Pat. No. 4,510,007 referred to above, to apply primer electrostatically as a powdery precondensated blend of epoxy resin and curing agent. However, this requires supplemental surface heating of the pipe to melt the powder, and very careful temperature control to evaporate reaction products from the epoxy cure and obtain a reasonably uniform layer of primer base coating. According to the present invention, a novel annular epoxy primer applicator is employed, which can be used with a liquid primer such as a "100% solids" composition, for excellent control of the thickness of the primer base coat.

Secondly, the application of sealing pressure to the freshly-applied jacketing presents considerable difficulties when cross-head extrusion is used to coat the pipe. A pressure roller of the kind useful in applying thermoplastic strip helically, as in U.S. Pat. No. 4,178,200, cannot be used on the hot tubular jacket of thermoplastic or adhesive/thermoplastic multilayer composite deposited on a pipe coming from a cross-head extruder.

SUMMARY OF THE INVENTION

The desirable result of applying sufficient pressure to develop adhesion of the coating in a straight-through process, without dislocating or blemishing the cross-extruded thermoplastic jacket, has now been achieved according to the present invention, by the use of an annular pressure applicator, operable to constrict the jacketed pipe along a band of surface shortly after initiation of a cooling quench, so that the top layer of polyethylene or other thermoplastic about the constricted region is solid and the lower layer still molten. The radial application of pressure is then effective to enhance adhesion, without damage to the coating.

Accordingly, in one aspect the present invention provides a method of applying a protective jacket to a steel pipe: (1) comprising the steps of applying a substantially even coating of epoxy primer in the liquid state to the outer surface of the pipe where the thickness of the epoxy is between about $25\mu$ and about $100\mu$, (2) raising the pipe temperature to between about 135° C. and about 200° C. to bring about partial curing of the primer coating and to provide a fluid surface, (3) coating the pipe with a jacket of adhesive copolymer before the primer has gelled and a thermoplastic, such as high-density polyethylene, using cross-head extrusion apparatus, and (4) after the primer has gelled, applying radial pressure to the surface of the jacketed pipe at a stage when the outer surface of the thermoplastic has hardened and while the inner portion thereof remains above the softening temperature, thereby achieving good adhesion of the jacket to the pipe.

The invention also provides apparatus for applying a uniform coating of liquid epoxy primer to the outer surface of a steel pipe, comprising a hollow chamber having front and rear walls with circular openings therethrough to receive and allow passage of the steel pipe to be coated. The front and rear wall openings are equipped with flexible annular sealing means operable to exert steady constrictive pressure on the pipe so as to permit liquid primer from within the chamber to be drawn smoothly onto the surface of the pipe as it is moved longitudinally through the applicator.

Finally, the present invention provides apparatus for sealing the extruded protective jacket onto the pipe surface by pressure comprising a spray-cooling quench chamber through which the jacketed steel pipe is conveyed longitudinally, a flexible, annular pressure applicator which receives the pipe as it is conveyed through the quench chamber and exerts radial pressure on the pipe surface at a position within the quench where the outer surface of the thermoplastic jacket has hardened while the inner portion thereof remains above the softening temperature of the thermoplastic and where the epoxy primer has gelled.

BRIEF DESCRIPTION OF THE DRAWINGS

Preferred embodiments of the invention will hereinafter be described with reference made to the drawings in which:

FIG. 5 is a vertical cross-sectional view of a pressure wheel assembly for use in applying the jacket to the pipe;

FIG. 6 is a side view of the pressure wheel assembly;

FIG. 8 is a vertical cross-sectional view of a cross-head extruder along lines 8—8 of FIG. 9; and FIG. 9 is a horizontal cross-sectional detail of the two stage cross-head extrusion process where adhesive and polyethylene coating is applied.

DETAILED DESCRIPTION

Figure 7:
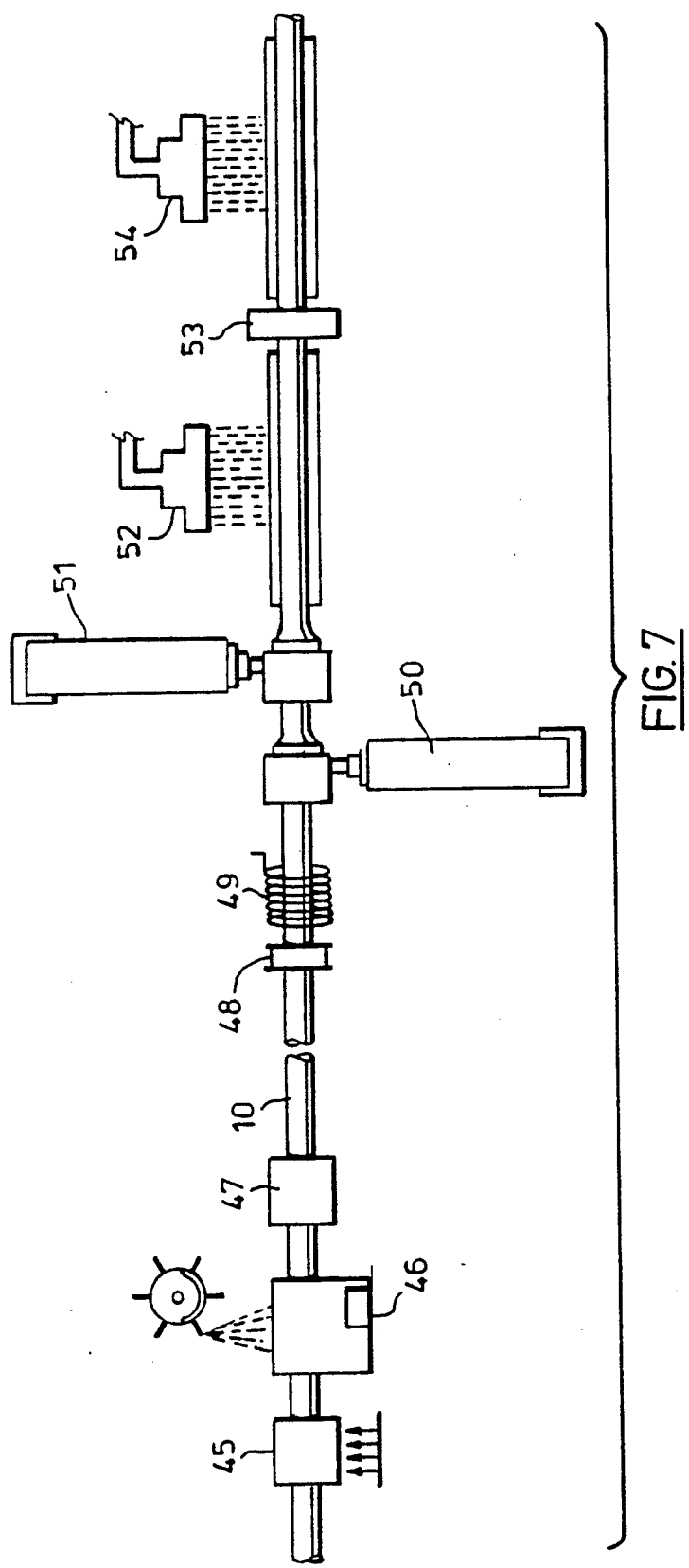
FIG. 7 is a schematic plan view of the entire pipe coating process, the pipe direction being from left to right.

Referring to FIG. 7, prior to applying a jacket of thermoplastic to a pipe 10 according to the method of the invention, the surface of the pipe should be abrasively cleaned to a near-white surface condition preferably by a shot blast cleaner 46 in-line, in order to remove rust particles and surface contaminants to create a clean surface to which epoxy primer coat will adhere well. The pipe may be preheated by preheat station 45, to remove residual moisture and ensure that the clean pipe is always at least 3° C. above the dew point and that the pipe is at the proper temperature for chromate pretreatment to follow. Optionally, the cleaned pipe may be chemically pre-treated as it is conveyed longitudinally through chromate pretreatment station 47, toward the cross-head extrusion apparatus. An aqueous chromate solution may be applied and permitted to dry onto the pipe surface, to provide an additional measure of corrosion resistance for the pipe.

Passing through the epoxy application station 48, the pipe is then coated with a substantially uniform coating of liquid epoxy primer, of a thickness between about $25\mu$ and about $100\mu$. When a thickness of primer less than about $25\mu$ is applied, the coated pipe which results has too low a resistance to cathodic disbondment. The upper limit of epoxy thickness of about $100\mu$ is dictated by considerations of cost and the inflexibility of thicker epoxy films at low temperatures, presenting the risk of cracking of the cured primer undercoat when the coated pipe bends. The epoxy coating may be applied by a number of conventional methods, such as "rugging" (drawing an epoxy-wetted piece of rug fabric across the pipe surface). For very large diameter pipes (greater than about 16 inches), liquid epoxy primer may be sprayed unto the pipe surface.

The epoxy coated pipe 10 is then conveyed through heating means such as induction coils 49 to initiate partial curing of the epoxy primer.

The epoxy coated pipe 10 thereafter proceeds through a first cross-head extrusion apparatus 50 where adhesive is applied to a still fluid epoxy primer and immediately to a second cross-head extruder 51 where a thermoplastic top coat is applied. Co-extrusion of the adhesive and top coat through a single die may also be employed although not shown in FIG. 7.

The top coated pipe 10 thereafter is conveyed through a quench chamber 24 comprising initial quench station 52 and final quench station 54. Between the two quench stations 52 and 54, radially inward pressure is applied to the outer surface of the pipe at the pressure applicator station 53 after the epoxy has gelled.

Figure 1:
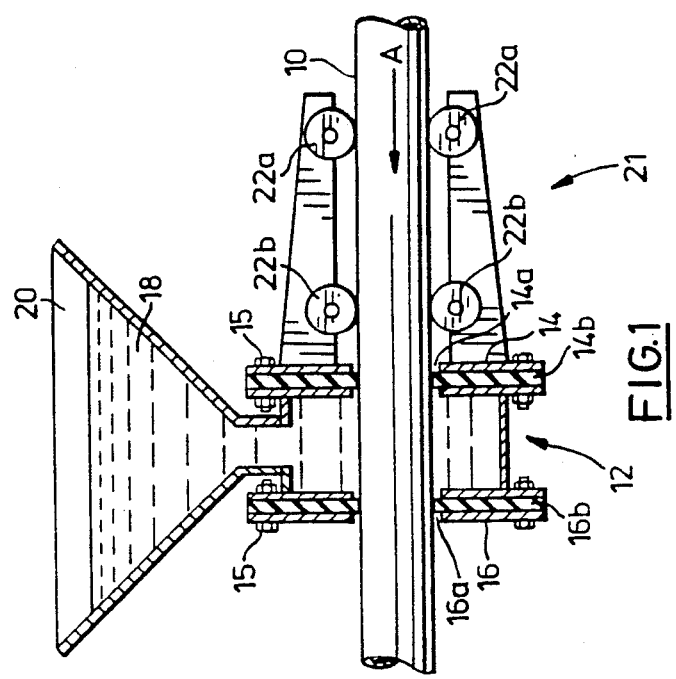
FIG. 1 is a vertical cross-sectional view of an epoxy primer applicator for use in carrying out the method of the invention.

Referring to FIG. 1, the pipe is coated with primer in an "endo" process according to one embodiment of the present invention by conveying the pipe through a novel applicator such as illustrated. The cleaned, pretreated and heated pipe 10 is translated longitudinally by conventional conveying apparatus (not shown) in direction "A" toward the cross-head extrusion apparatus (see FIG. 7) where adhesive and thermoplastic will be applied. Pipe 10 passes through the annular reservoir 12 of the primer applicator, by way of circular openings 14a and 16a in front and rear walls 14 and 16, respectively. Liquid epoxy primer 18, added to reservoir 12 by means of filling hopper 20, is prevented from flowing freely out of reservoir 12 by flexible front and rear annular sealing means 14b and 16b.

In the specific apparatus illustrated, 14b and 16b are natural rubber rings, fractionally smaller in diameter than pipe 10, and clamped by bolts 15 between the elements of double walls 14 and 16, respectively. It will be appreciated, however, that many equivalent arrangements of annular sealing means could be employed to achieve the desired result, viz. a coating and wiping action on the pipe passing through reservoir 12 so as to apply a uniform coating of primer thereto.

"Epoxy primer" is used herein to describe generally any suitable mixture of epoxy resin with curing agents such as amines. The material favoured in applying the method of the invention is "100% solids" epoxy, which cures from liquid to solid without any appreciable change in volume. It has the advantage over solvent-based epoxy formulations that extrusion of topcoat may be carried out without having to wait until volatile components are driven off. Solvent based-epoxy primer or fusion bond epoxy coating may be used instead, but such materials may not lend themselves to application by use of the applicator described in connection with FIG. 1.

An epoxy applicator according to the invention may advantageously be made with integral carriage means 21 extending from front wall 14 and having centering wheel pairs 22a and 22b, independently adjustable to assist in the centering of pipe 10 accurately within openings 14a and 16a.

Further, the epoxy applicator of FIG. 1 may be suspended in the path of advancing pipe 10 on a line supplied with a counterbalancing set of weights (not shown) in order to avoid any net transverse force on the pipe.

Because liquid epoxy primers will eventually solidify under ambient conditions, it is desirable to provide means (not shown) for pumping and recirculating primer through reservoir 12 by way of a cooling system. From the applicator, pipe 10 is conveyed further to heating means, e.g. induction coils 49, where the pipe temperature is raised to betWeen about 135° C. and about 200° C., in order to initiate partial curing of the primer and to provide a hot fluid surface to receive the extruded adhesive and thermoplastic coatings. However, it is essential that the rate of curing of the primer be such that it is still fluid (e.g., not gelled) when the extruded adhesive is applied. This allows a good bond to be developed between the primer and the adhesive.

The heated pipe is then conveyed by a conventional conveyor to a first cross-head extrusion apparatus 50 where adhesive is applied and immediately thereafter to a second cross-head extruder 51, where the thermoplastic top coat is applied.

Referring to FIG. 9, a two stage cross-head extrusion process is shown. A first cross-head extrusion die 55 applies a layer of adhesive 58 to the epoxy coated pipe 10. Thereafter a second cross-head extrusion die 55' applies a layer of thermoplastic top coating 59 of high density polyethylene upon the adhesive coated pipe 10.

Referring to FIGS. 8 and 9, in order to avoid the entrapment of air bubbles, between the epoxy coated pipe 10 and the adhesive layer 58, and between the adhesive coated pipe 10 and the top coating 59, vacuum pressure is created through the use of pressurized air exhausted through air nozzles 57 and 57'. Air is supplied to nozzles 57 and 57' through distribution rings 56 and 56' positioned between the pipe 10 and extruder dies 55 and 55'. The air is exhausted in the direction opposite the direction of pipe travel. The films of the adhesive layer 58 and top coating 59 are drawn toward the pipe 10 under the vacuum created by the exhausted air due to the Venturi effect as air passes through the restriction caused by the distribution rings 56 and 56' in the annular air passage between the pipe 10 and dies 55 and 55'.

As adhesive, a copolymer such as LOTADER PX 8460 or the like may be used. Such materials are characterized by the presence of chemically active acrylate and maleic acid groups which provide an excellent bond between the curing epoxy resin and the thermoplastic (HDPE) topcoat.

The cross-head extruder will typically operate at a temperature of between 185° and 200° C. in the heating zone, with the extruder adapter set at 200° to 215° C., the extruder die heated to 215° to 225° C., and the die lips significantly cooler than the extruder die, typically at about 210° C. The die lips are pre-set at a thickness of approximately 2-3 mm and adhesive delivery rate is such that the adhesive is drawn down to a thickness of approximately 150-200$\mu$ as it contacts the pipe surface. The pipe has to be sufficiently hot to keep the adhesive in the molten state, preferably in the range 135°-200° C., otherwise the adhesive may cool down too quickly and solidify on the pipe surface without forming a proper bonding link between substrate and topcoat.

When polyethylene is used as the topcoat, the mechanical properties of the coated pipe generally improve with increasing density of the polyethylene. A density of between about 0.930 and about 0.960 g/cm$^3$ may usefully be used, the preferred range being 0.948 to 0.951 g/cm$^3$. The upper limit of density relates to the practical difficulties in extruding a film of such material. Too, very high density (highly crystalline) polyethylene is extremely stiff at low temperatures and could crack if there is any flexion of the coated pipe.

The method and apparatus of the invention are equally applicable to the co-extrusion of polyethylene and the copolymer adhesive through a single die in a cross-head extruder so as to form a single layer, with the polyethylene bonded to, but discrete from the copolymer adhesive. Coextrusion assures superior adhesion between the polyethylene and adhesive layers.

Figure 2:
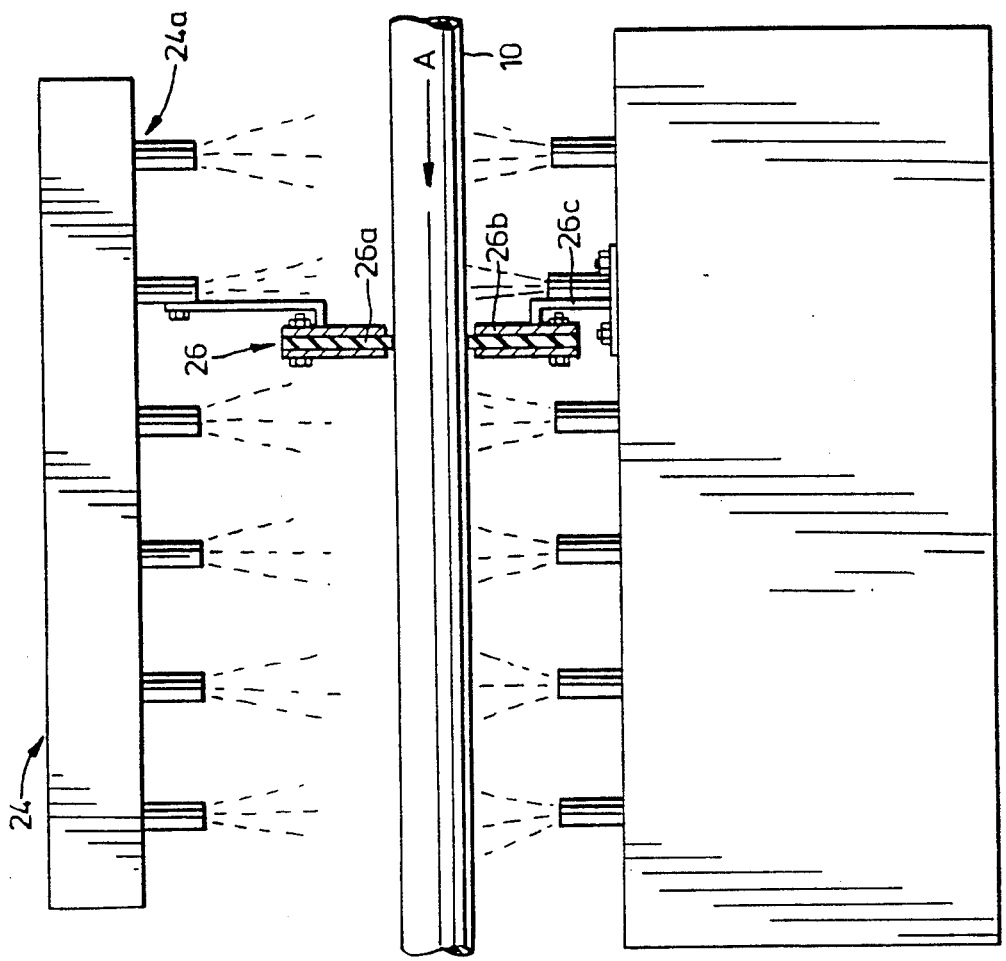
FIG. 2 is a side view of a water quench equipped with a pressure ring for use in applying a jacket to a pipe according to the invention.

Whether a two-stage extrusion or co-extrusion has been carried out, the still-hot pipe coated with primer, adhesive and high density polyethylene is then conveyed into a quench chamber, indicated generally at 24 in FIG. 2, where it is rapidly cooled with variously directed streams of water from nozzles 24a. Radial pressure is then applied to the surface of the jacketed pipe after the primer has gelled over a region which has been quenched only to the extent that the outer surface of the polyethylene coating has hardened. The inner portion should still be above the softening temperature, so that the constriction of the pipe effects the best possible adhesion of all layers.

A pressure applicator adapted for use of the coating method of the present invention is a flexible annular pressure applicator indicated generally at 26 in FIG. 2.

The pressure applicator consists of a specially molded rubber ring 26a, of a diameter slightly smaller than that of pipe 10. Ring 26a is so molded as to allow for easy entry of pipe 10, but to increase the constrictive pressure gradually from entry to exit of the pipe through it. It has been found that a rubber ring made of a Durometer 70 rubber, as measured on the hardness scale, is satisfactory. Ring 26a is mounted by clamping plates 26b and support brackets 26c at a fixed position along the path of travel of the pipe through the quench, selected so that pressure is applied after initial quenching, but before the underside of the topcoat and the adhesive layer have cooled and after gelling of the epoxy layer.

Preferably, provision is made in the mounting of ring 26a to allow for small transverse movement within the vertical plane, to accommodate any small lateral movement of pipe 10 as it travels through the quench region and pressure applicator along the "endo" conveyor.

The function of pressure applicator 26 is to apply radial pressure to the polyethylene coating so as to bring together the epoxy, the adhesive and polyethylene in intimate bonding contact. It is essential that the position of the applicator in the quench tank be such that, over the pipe's annular surface region under pressure at any given time, the polyethylene has cooled down just sufficiently to develop a "skin" at the top, so that it will not tear under the friction of passage through ring 26a. The lower layer of polyethylene topcoat should still be molten to adhere to the copolymer adhesive.

The following specific experimental example is illustrative of the invention:

A four inch pipe was cleaned abrasively to a near-white finish using a mixture of steel shots and grit to the average anchor pattern depth of 50 $\mu$.

A chromate solution, prepared by mixing a 10% chromate (Pyrene Corporation) with 90% water, was applied by brushing onto the pipe, previously heated to 60° C. The thickness of the wet solution was about 25μ. The chromate solution was allowed to evaporate before the pipe was treated further.

Epoxy primer was prepared by mixing 100 parts of Dow Epoxy Resin D.E.R. 331 with 50 parts of Versamid 125 from Henkel Corporation and 15 parts of red iron oxide pigment, Bayferox from Bayer Chemical Co. Ltd. The primer was applied to the pipe using the epoxy primer applicator of FIG. 1, equipped with a natural rubber (40 Durometer) wiping ring, to a thickness of 50 microns as measured on top of the anchor pattern. The pipe temperature during application of epoxy primer was 40° C.

Immediately after application of the primer, the pipe proceeded on the "endo" conveyor to an induction coil, where the temperature was raised to 150° C., followed immediately by a cross-head extrusion of adhesive, namely LOTADER PX 8460, obtained from CdF Chimie (France). That product is a terpolymer containing active groups. The adhesive was extruded at a thickness of 150 μ.

The pipe proceeded further to a second cross-head extruder where high density polyethylene was applied at a thickness of 1 mm. The pipe proceeded from the second extruder to a quench bath equipped with a rubber ring pressure applicator as described above and illustrated in FIG. 2, located approximately 25 seconds of pipe travel time into the quench.

The coated pipe product obtained by the foregoing procedure exhibited a peel strength adhesion in the range of 100N/cm–150N/cm. The cathodic disbondment test as measured at room temperature, at 5V DC, in a 5% NaCl solution for thirty days, showed a disbonded radius of 4–8 mm. The product is bendable up to 4.76 degrees/pipe diameter at −30° C. without failure. The impact strength of the product was found to be in the area of 10J, using a 16 mm round tup. In addition, the hot water resistance of the product was excellent; there was no loss of adhesion upon exposing the sample to boiling water for 24 hours.

Figure 4:
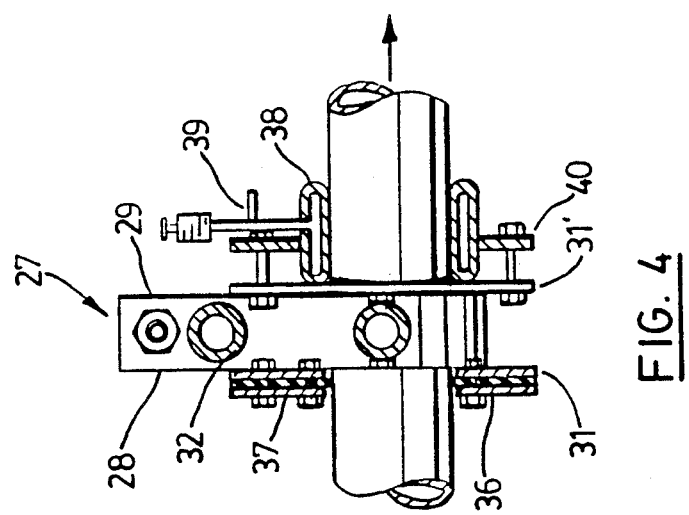
FIG. 4 is a side view of the applicator of FIG. 3.
Figure 3:
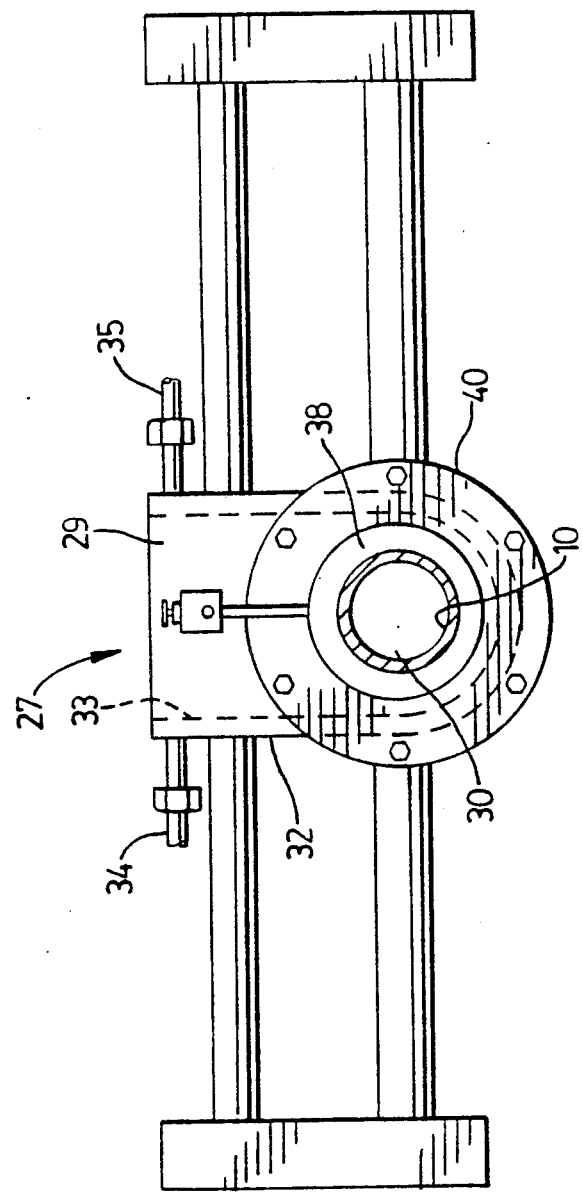
FIG. 3 is a vertical cross-sectional view of an alternative epoxy primer applicator.

In order to achieve the superior peel strength adhesion which characterizes the jacket applied to the pipe by the foregoing method, it is most important that the epoxy primer be applied as a liquid to the pipe surface as an even film of thickness between about 25μ and 100μ. One applicator for this purpose has been described. An alternative applicator for the purpose is shown in FIGS. 3 and 4.

This alternative applicator comprises a hopper 27 to which the epoxy primer is supplied, the lower portion of the hopper defining a reservoir through which the pipe 10 passes as it is conveyed longitudinally, in the direction of the arrow A, towards the cross-head extrusion apparatus. The hopper 27 has flat, vertical, front and rear walls 28, 29 with aligned circular openings 30 through which the pipe 10 passes. Each of the openings is bounded by an annular peripheral flange 31, 31' secured to the respective wall 28, 29. The side wall 32 of the hopper 27 is provided with a cooling jacket 33 supplied with cooling water via an inlet 34. The water outlet is shown at 35.

Adjacent to the front opening 30 is an annular wiper 36 of rubber, which wipes the surface of the pipe 10 and prevents leakage through the opening 30. The wiper 36 is clamped between the flange 31 and a second annular flange 37 bolted to it. Adjacent to the rear opening is a second wiper consisting of an annular rubber bladder 38 which wipes the coated surface of the pipe emerging from the rear opening. The wiping pressure of the bladder 38 is adjusted by controlling the air pressure in the bladder by means of a pressure regulator 39. The bladder is supported by an annular support 40 bolted to the rear flange 31'.

An alternative pressure applicator for applying radial pressure to the surface of the jacketed pipe is shown in FIGS. 5 and 6. This alternative pressure applicator consists of a pressing wheel assembly. The wheels of the assembly are arranged in two sets of four wheels each, 41, 41', the two sets being axially offset and staggered in overlapping relation around the circumference of the pipe. The sets of wheels are mounted on axles 42, 42' supported from opposite sides of an octagonal support frame 43 by adjustable support legs 44, 44'.

The wheels have low pressure tires which bear against the pipe jacket at the stage at which its outer surface has hardened, thereby to achieve the good adhesion of the jacket to the pipe.

We claim:

1. A method of applying a protective jacket to a steel pipe, comprising the steps of:
    selecting a thermoplastic jacketing material;
    applying a coating of liquid epoxy primer to the outer surface of the pipe, of a substantially even thickness between about 25μ and about 100 μ;
    raising the temperature of the pipe to between about 135° C. and about 200° C. so as to bring about partial curing of said primer coating in a state at which it is fluid;
    conveying the heated pipe longitudinally through a first cross-head extruder and extruding onto said primer coating before it has gelled a layer of adhesive, of thickness between about 100μ and about 300μ, composed of a copolymer capable of bonding to the curing surface of said primer coating and to said selected thermoplastic jacketing material, the extrusion temperature being sufficiently high to maintain said adhesive layer in a molten state;
    immediately after application of said adhesive layer, further conveying the heated pipe through a second crosshead extruder and extruding onto said molten adhesive an outer jacket of said selected thermoplastic material having a thickness between about 0.5 mm and about 1.5 mm; and
    further conveying the jacketed pipe longitudinally through a water spray cooling quench while applying steady radial pressure to the surface of the jacketed pipe over an annular region located within said quench at a position along the path of travel of the pipe where the outer surface of said outer jacker has hardened while the inner portion thereof remains above the softening temperature of said thermoplastic material, wherein said step of applying steady radial pressure occurs after the primer has gelled.

2. A method according to claim 1, wherein said epoxy primer is applied in the liquid state by conveying the pipe longitudinally through annular applicator means operable to dispense a substantially uniform coating of epoxy primer to the surface of a pipe passing therethrough.

3. A method according to claim 2, wherein said adhesive comprises an ethylene copolymer having acrylate and maleic acid functional groups.

4. A method according to claim 1, wherein said outer jacket of thermoplastic material consists essentially of polyethylene having a density from about 0.930 g/cm$^3$ to about 0.960 g/cm.

5. A method according to claim 1, wherein said outer jacket of thermoplastic material consists essentially of polyethyelene having a density from about 0.948 g/cm$^3$ to about 0.951 g/cm$^3$.

6. A method according to claim 1, wherein the thickness of said thermoplastic material is between about 0.75 mm and about 1.1 mm.

7. A method according to claim 1, wherein said layer of adhesive is extruded at a thickness between about 150$\mu$ and about 200 $\mu$.

8. A method according to claim 1, wherein the application of epoxy primer to the pipe is preceded by the steps of abrasively cleaning the pipe surface to a near white surface condition, then pretreating the pipe with an aqueous chromate solution for enhancing corrosion resistance of the pipe surface.

9. A method of applying a protective jacket to a steel pipe, comprising the steps of:
selecting a thermoplastic jacketing material;
applying a coating of liquid epoxy primer to the outer surface of the pipe, of a substantially even thickness between about 25$\mu$ and 100 $\mu$;
raising the temperature of the pipe to between about 135° C. and about 200° C. so as to bring about partial curing of said primer coating in a state at which it is fluid;
conveying the heated pipe longitudinally through a cross-head extruder and co-extruding onto said primer coating a double-layered jacket consisting of an inner layer of adhesive, of thickness between about 100$\mu$ and about 300$\mu$ composed of a copolymer capable of bonding to the curing surface of said primer coating and to said selected thermoplastic jacketing material; and an outer layer composed of said selected thermoplastic jacketing material having a thickness between about 0.8 mm and about 1.1 mm; and
further conveying the jacketed pipe longitudinally through a water spray cooling quench while applying steady radial pressure to the surface of the jacketed pipe over an annular region located within said quench at a position along the path of travel of said pipe where the outer surface of said outer jacket has hardened while the inner portion thereof remains above the softening temperature of said thermoplastic material, wherein said step of applying steady radial pressure occurs after the primer has gelled.

10. A method according to claim 9, wherein said epoxy primer is applied in the liquid state by conveying the pipe longitudinally through annular applicator means operable to dispense a substantially uniform coating of epoxy primer to the surface of the pipe passing therethrough.

11. A method according to claim 10, wherein said adhesive comprises an ethylene copolymer having acrylate and maleic acid functional groups.

12. A method according to claim 9, wherein said outer jacket of thermoplastic material consists essentially of polyethylene having a density from about 0.930 g/cm$^3$ to about 0.960 g/cm $^3$.

13. A method according to claim 9, wherein said outer jacket of the thermoplastic material consists essentially of polyethylene having a density from about 0.948 g/cm$^3$ to about 0.951 g/cm$^3$.

14. A method according to claim 9, wherein said layer of adhesive is extruded at a thickness between about 150$\mu$ and about 200 $\mu$.

15. A method according to claim 9, wherein the application of epoxy primer to the pipe is preceded by the steps of abrasively cleaning the pipe surface to a near white surface condition, then pretreating the pipe with an aqueous chromate solution for enhancing corrosion resistance of the pipe surface.

* * * * *